United States Patent [19]
Eschholz

[11] 3,851,369

[45] Dec. 3, 1974

[54] APPARATUS FOR APPLICATION OF RESILIENT SEALS

[75] Inventor: Harald Eschholz, Islington, Ontario, Canada

[73] Assignee: Dick Gordon Rockwell, Ontario, Canada

[22] Filed: May 18, 1973

[21] Appl. No.: 361,509

[30] Foreign Application Priority Data
Apr. 27, 1973 Canada.............................. 170739

[52] U.S. Cl. ................................. 29/211 D, 29/235
[51] Int. Cl. ......................... B23q 7/10, B23p 19/02
[58] Field of Search .......... 29/211 C, 211 R, 211 D, 29/235

[56] References Cited
UNITED STATES PATENTS
3,605,238  9/1971  Eschholz........................... 29/211 D
3,605,239  9/1971  Eschholz........................... 29/235 X

*Primary Examiner*—Thomas H. Eager
*Attorney, Agent, or Firm*—Rogers, Bereskin & Parr

[57] ABSTRACT

Apparatus for placing a distensible annular component in a seat formed in a workpiece. The apparatus includes feed means and an escapement which receives the component from the feed means. A transport mechanism has a plunger which receives the component from the escapement and places the component in the seat. The escapement supports the component above the plunger and an actuator moves an element between a guide position in which the element supports the component and a withdrawn position which permits the component to fall. A rod moves between a withdrawn position in which a lower end of the rod is above the movable element, and an extended position in which the rod projects through the component as the component rests on the movable element and in which said end of the rod is immediately adjacent the plunger end portion with the plunger in a withdrawn position. Another actuator is coupled to the rod to move the rod between the withdrawn and extended positions. A sequential control system is coupled to the respective actuators to move the actuators sequentially to transport the component from the feed means into the seat.

10 Claims, 7 Drawing Figures

APPARATUS FOR APPLICATION OF RESILIENT SEALS

This invention relates to apparatus for automatically inserting distensible annular components such as O-rings, lip seals, and the like into seats formed in workpieces requiring such components.

Lip seals, O-rings, and other forms of similar components are used in many industrial applications. For the purposes of the present invention, the term "distensible resilient components" will be used as a generic term for such components.

Many mechanical assemblies are mass produced and include numerous distensible annular components which must be assembled into individual parts before completing the assembly. Although several types of apparatus are available for handling and positioning these components, each has two distinct parts, namely an escapement for controlling the flow of components separately through the apparatus and a plunger for receiving individual components from the escapement and positioning the components on a part or workpiece.

There are two types of plungers. A first type is referred to as an internal type for engaging components in a seat inside a workpiece, and the second type is referred to as an external type for engaging components in a seat on an external surface of the workpiece.

Examples of prior art escapements are found in U.S. Pat. Nos. 3,605,238 and 3,605,239 to the present applicant and Canadian Pat. No. 806,878. In each instance a component is first located accurately about the axis of a plunger and then the plunger moves axially to pick up the component. While these escapements are satisfactory they tend to require expert maintenance.

It is an object of the present invention to provide an improved escapement which locates distensible annular components on a plunger directly without the steps of first locating the components about the plunger axis and then moving the plunger through the component.

Accordingly, in one of its aspects, the present invention provides an escapement for use in transporting distensible annular components on to an end portion of a plunger which then engages the components in seats formed in workpieces. The escapement includes feed means adapted to transport components and a movable element adapted to receive the components one at a time from the feed mechanism with the element in a guide position. A rod is movably mounted for extending downwardly from a withdrawn position through a component on the movable element into an extended position where a lower end of the rod is immediately adjacent this end portion of the plunger. When the rod is in the extended position the movable element can be moved into a withdrawn position to allow the component to fall onto the plunger end portion guided by the rod.

The aforementioned U.S. Pat. Nos. 3,605,238 and 806,878 also teach forms of transport mechanisms having plungers which carry components into a workpiece in which a seat is formed inside an opening in the workpiece. However, in both patents the form of the plunger must be such that the component is pulled into the workpiece by two diametrically opposed projections on the plunger. These plungers require that the component be located accurately before the component can be entered into the workpiece.

It is a further object of the present invention to provide a simplified plunger for use in entering distensible annular components into a seat within an opening formed in a workpiece.

Accordingly, in another of its aspects, the invention provides a plunger for receiving distensible annular components from an escapement and transporting the components horizontally into a seat inside a workpiece. The plunger comprises a casing and an inner element slidably engaged inside the casing for moving horizontally and biassed into an outer position. The inner element includes a saddle piece for locating the component with the component hanging loosely on the inner element, and the casing includes a forward portion below the saddle piece for pushing the component into the seat when the plunger has moved the saddle piece into a position adjacent the seat.

These and other aspects of the invention will be better understood with reference to the drawings in which.

Figure 1:
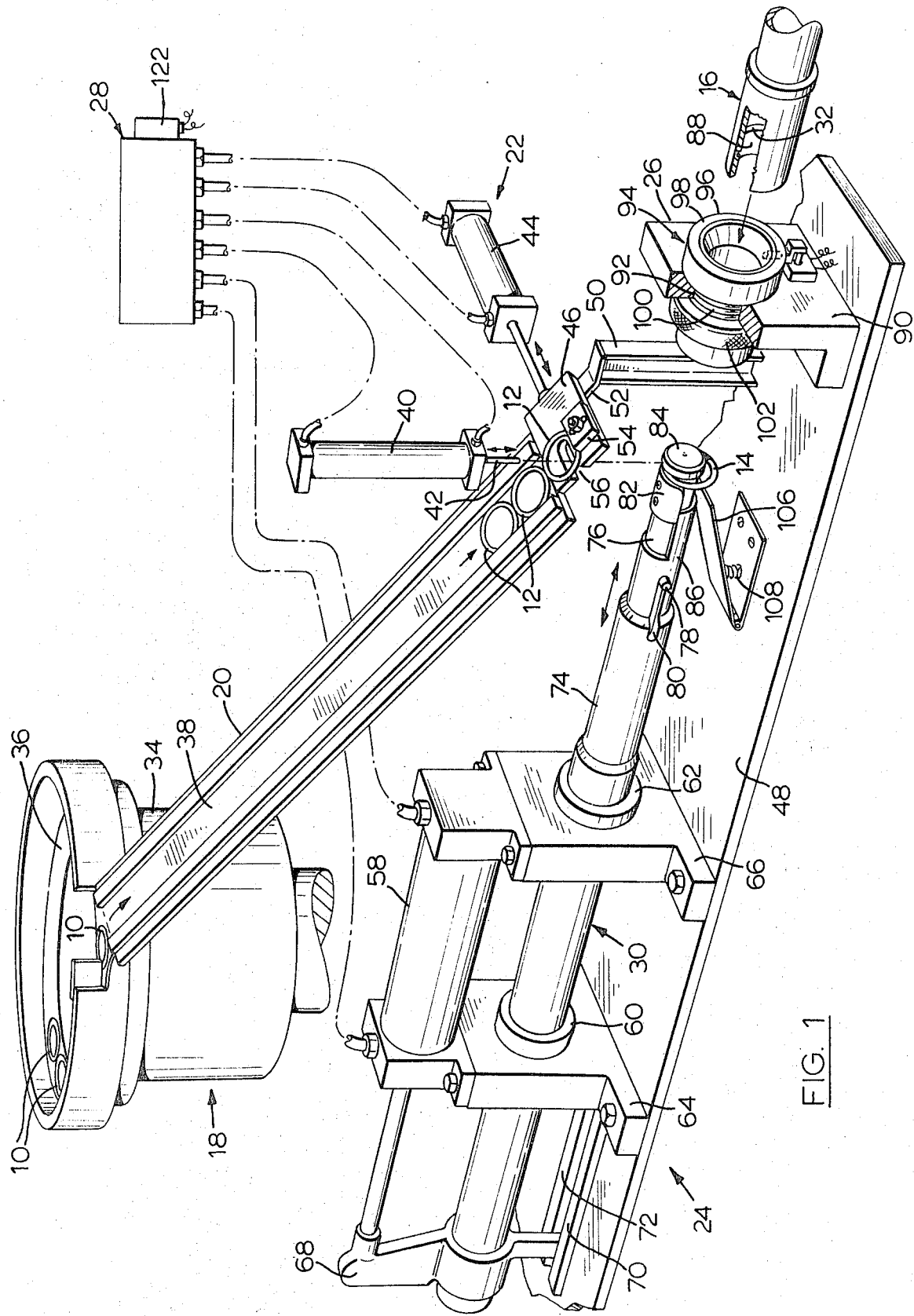
FIG. 1 is a partly diagrammatic perspective view of apparatus incorporating the invention.

Reference is made first to FIG. 1 which shows apparatus for feeding and inserting distensible annular components 10, 12 and 14 into a workpiece 16. The components are sorted by a feed mechanism 18 which directs the components into an upper end of an inclined chute 20 of an escapement 22. The components are then fed one at a time onto an end of a transport mechanism 24 taking up the position indicated by the component 14. Once the workpiece 16 has been engaged in a locating fixture 26, a sequential control system 28 causes a plunger 30 to move longitudinally into an end of the workpiece 16 to deposit the component 14 in a seat in the form of an internal annular groove 32 in the workpiece. The plunger 30 is then withdrawn and the escapement 22 places the next component on the plunger ready for insertion into another workpiece. The actual insertion will not commence until a new workpiece has been placed in the fixture 26 as will be described.

Feed mechanism 18 can be of any conventional type and typically consists of a drum 34 having an internal inclined ramp 36. The drum is made to vibrate rotationally so that the components 10 appear to climb the ramp for eventual exit onto an upper end of the chute 20. This chute defines a smooth channel 38 having a width slightly wider than that of an outside diameter of the component 10 so that the component will slide freely down the channel 38 into engagement with one of the components 12 at the bottom of the chute 20. If preferred the chute can be more or less inclined. However if the incline is below the angle of friction the components will have to be pushed or vibrated down the chute. Also, if the incline is steep it may become desirable to add a cover over the channel 38. In a simple gravity type as shown, it is desirable to have each component slide freely without creating a tendency for the component to jump out of the channel when it collides with preceding components at the bottom of the chute. The chute 20 forms part of feed mechanism 18.

Figure 2:
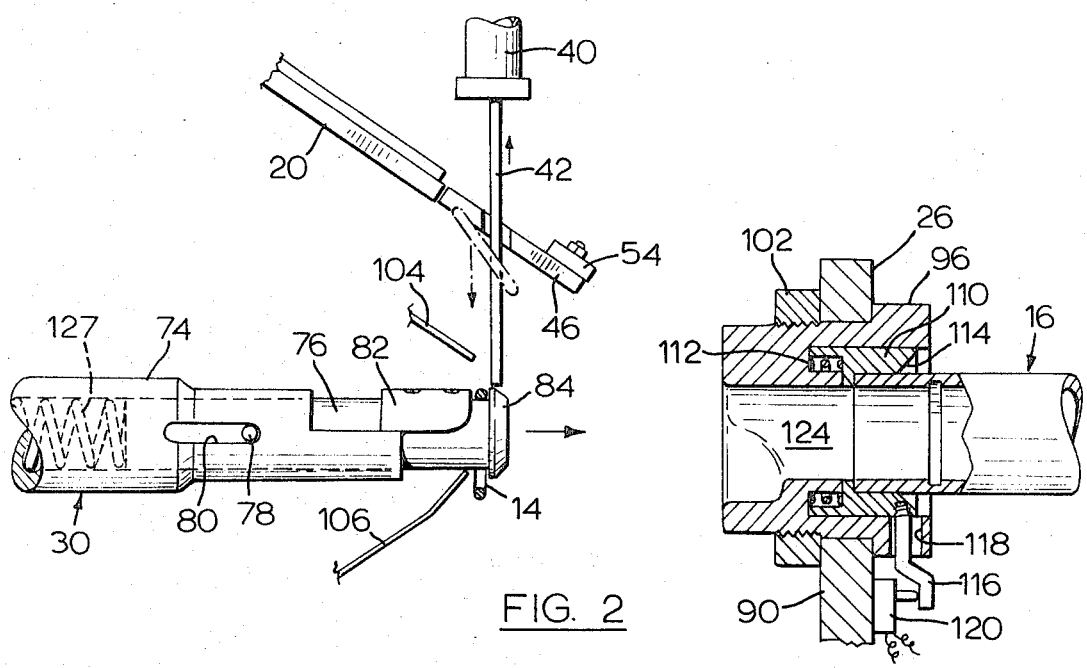
FIGS. 2 to 5 are partly sectioned side views of part of the apparatus showing the operation of the apparatus when inserting a distensible annular component into a workpiece.

Escapement 22 includes a vertically mounted first actuator 40 for reciprocating a rod 42 vertically between a withdrawn position shown in FIG. 1 and an extended position shown in FIG. 2, and a second actuator 44 for reciprocating a movable element or slider 46 horizontally between a guide position shown in FIG. 1 and a withdrawn position shown in FIG. 2. The actuators 40, 44 are pneumatically connected to the sequential control system 28 and are mounted on suitable brackets (not shown) attached to a base 48 which supports the apparatus. The control system 28 is typical of any suitable control system. Slider 46 forms a continuation of the bottom of channel 38 in chute 20 to receive components 12 off the end of the chute as will be described. A simple support 50 includes a leg 52 to support the lower end of the chute 20 and also to form a guide to support the slider 46 and to prevent rotation of this slider. An adjustable stop 54 is attached to an upper face of the slider 46 and positioned so that the lowermost component 12 is just outside the bottom boundary of the channel 38. The stop 54 can be adjusted towards or away from the chute 20 to accommodate various sizes of component 12.

The escapement slider 46 defines a slot 56 in alignment with the direction of movement of the slider and also positioned to allow the first actuator rod 42 to pass through the lowermost component 12 without engaging the slider 46. The arrangement and operation of parts forming the escapement 22 will be better understood after FIGS. 2 to 5 have been described.

FIG. 1 also illustrates the general arrangement of transport mechanism 24 which includes the plunger 30 and a third actuator 58 which is also connected pneumatically to the sequential control system 28. The plunger 30 is slidably mounted in journal bearings 60, 62 in pedestals 64, 66 attached to base 48. Bearings 60, 62 guide the plunger 30 to move longitudinally and such movement is controlled by the actuator 58 which is coupled to a bracket 68 on an outer end of the plunger 30. A lower end of the bracket 68 slides between a pair of guides 70, 72 attached to the base 48 to prevent rotation of the plunger 30 as it moves longitudinally. The plunger 30 includes a casing 74 which, at its forward end, contains an inner element 76. As will be described, the inner element 76 is biassed outwardly and is capable of being moved longitudinally inside the casing 74 by an amount controlled by a pin 78 connected to the element 76 and contained at its ends in a pair of slots 80 (one of which is seen) in the casing 74. A saddle piece 82 is attached to an upwardly-facing side of the inner element 76 adjacent an enlarged end portion 84 for combining with the end portion 84 to locate the component 14 longitudinally. The end portion 84, saddle piece 82 and a forward portion 86 of the casing 74 have a common external diameter which is slightly less than that of an opening 88 in the work piece 16 in the vicinity of the annular groove 32.

The inter-relationship between the plunger 30, the escapement 22, and the workpiece 16 will be more fully described with reference to FIGS. 2 to 5.

The locating fixture 26 consists of a heavy bracket 90 attached to base 48 and having an upright portion defining an opening 92 for receiving a variety of guides 94 depending upon the size of the workpiece 16. Similarly corresponding plungers 30 are used with different sizes of the workpiece 16. the guides 94 can be made to various sizes for particular workpieces and inserted in the bracket 90. The typical guide 94 seen in FIG. 1 consists of a first element 96 having a collar 98 in engagement with the bracket 90 and a threaded portion 100 projecting through the opening 92. A second element 102 is threadably engaged on the portion 100 to retain the first element 96 in place on the bracket 90. Locating fixture 26 will be more fully described with reference to FIG. 2.

Consider a position of the apparatus shown in FIG. 1 in which the lowermost component 12 is to be moved into the position shown by component 14 and in which there is no component on the plunger 30. In practice, this corresponds to a condition midway through a cycle as will be described.

To transport the lowermost component 12, the first actuator 40 is extended so that the rod 42 moves vertically downwards from the withdrawn position shown in FIG. 1 into the extended position shown in FIG. 2. The rod passes through the slot 56 in the slider 46 until the lowermost end of the rod 42 is almost in engagement or just touching the enlarged end portion 84 of the plunger 30 as seen in FIG. 2. At this point, the second actuator 44 withdraws the slider 46 from the guide position to the withdrawn position where it is out of alignment with the channel 38 of the chute 20 so that the lowermost component 12 is restrained only by the rod 42. Consequently, as seen in FIG. 2, this component falls vertically and because of its shape it tends to find its way into the position indicated by component 14. Respective upper and lower deflection plates 104, 106 can be used. (The upper plate 104 is omitted from FIG. 1 for clarity of drawing).

It will be appreciated that the actuator 40 need not be vertical but can be located at an angle to the vertical provided that the arrangement is such that component 12 falls downwardly when the slider 46 is withdrawn. The plate 106 is pivotally attached to the base 48 as shown in FIG. 1 and a spring 108 is used to bias the plate upwardly into engagement with the plunger 30. It will evident that when the component 12 falls down the rod 42, it will tend to collide with the plate 104 to convert the position of the component into a more vertical orientation for engagement over the end portion 84 of the plunger 30. As the component engages over this end portion it may tend to swing erratically and for this reason the deflection plate 106 is positioned to allow the component to hit the end of this plate and thereby align the component for engagement on the plunger in the position shown in FIG. 2. The plate 106 is biassed by the spring 108 so that as the plunger moves, the plate 106 is simply deflected and returns to the position shown in FIG. 2 when the plunger returns to its original position.

The position of the rod 42 relative to the chute 20 is such that when the lowermost component 12 falls down the rod, the next component slides into engagement with this rod but does not fall out of the chute 20. Consequently, the rod maintains this component in the chute until the slider 46 is again placed in the FIG. 1 position and the rod is withdrawn upwardly so that the component then slides into the lowermost position shown in FIG. 1. This position of the apparatus corresponds to a rest position when an operator has yet to start the apparatus.

Initially, before a cycle commences, the workpiece 16 is engaged in the fixture 26 which has an internal sleeve 110 slidably engaged in the first element 96 and biassed outwardly by a spring 112. The sleeve has a tapered entrance 114 for better locating the workpiece 16 and an arm 116 is attached to the sleeve 110 to extend downwardly through an opening 118. This arm serves to retain the sleeve 110 in the element 96 and also engages a switch 120 when the workpiece is entered in the sleeve 110 and pushed axially. The switch is coupled electrically to a relay or other such device 122 (FIG. 1) on the sequential control system 28. In the position shown in FIG. 2, the engagement of the workpiece 16 in the sleeve 110 results in the arm 116 closing the switch 120 to commence a cycle controlled by the system 28 (FIG. 1). Once the workpiece 16 is engaged, the transport mechanism 24 causes the plunger 30 to move forwardly carrying component 14 into the workpiece 16.

Figure 3:
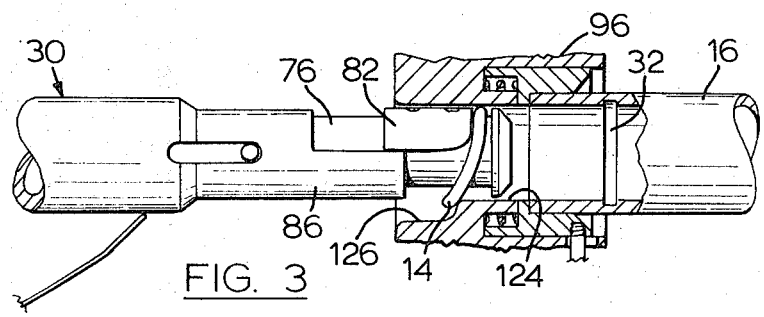

As seen in FIG. 3, the plunger 30 moves from a rest position shown in FIG. 2 to carry the component 14 into an opening 124 in the first element 96. The mouth 126 of the opening 124 is enlarged at its lower part for guiding a lower part of the component 14 until the seal is well engaged in the opening 124. Further travel of the plunger causes the component to be deflected at its lower portion as indicated in FIG. 3 to wrap the component rearwardly about a portion of the saddle piece 82. The component 14 remains in this position relative to the plunger 30 until the FIG. 4 position is reached at which point the upper part of the component 14 is in alignment with the annular groove 32 in the workpiece 16. The plunger 30 has now reached an extended position. Consequently, an upper portion of the component 14 is free to move into this annular groove but is restrained from moving longitudinally by the plunger end portion 84 and the saddle piece 82. At this point, the plunger pin 78 has reached the first element 96 and is in engagement with an end of this element so that the inner element 76 of the plunger 30 cannot move any further towards the workpiece 16.

Figure 4:
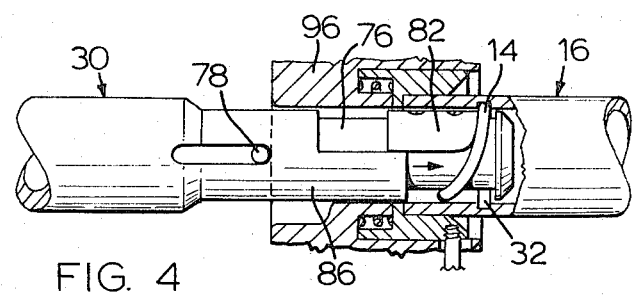
Figure 5:
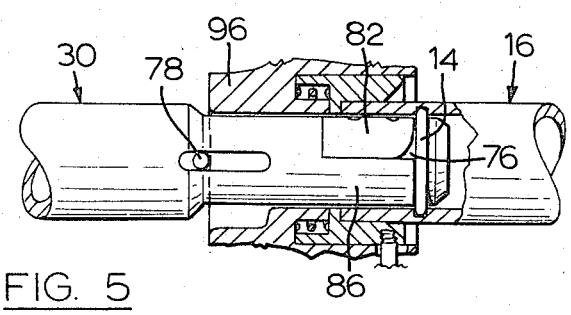

As indicated in FIG. 2, the element 76 is biased outwardly by a compression spring 127 and is restrained from moving out of the casing 74 by the pin 78 in slot 80 of the casing 74. However, the slot 80 permits the element 76 to move inwardly relative to the casing 74. Consequently when the third actuator 58 (FIG. 1) moves the plunger 30 further towards the workpiece 16, the casing 74 continues to move although the inner element 76 has stopped as shown in FIG. 4. An end of the casing below the saddle piece 82 then engages the component 14 and pushes the component towards alignment with the annular groove 32. Eventually, the plunger reaches a strip position shown in FIG. 5 at which point the component 14 is fully engaged in the workpiece 16.

Next the third actuator 58 withdraws plunger 30 to position the plunger to receive a new component while another workpiece is substituted for the workpiece 16 which now has a component 14 in its groove 32.

It will be evident that the form of the plunger first element 76 will depend on the type of workpiece requiring a component 14. For instance, if the opening in the workpiece had a portion of reduced diameter immediately adjacent the annular groove, then it may not be necessary to include an enlarged portion 84 because the portion of reduced diameter would act to locate the component in the groove. Similarly, this portion of reduced diameter could be used to limit longitudinal movement of the first element 76 instead of using the engagement of pin 78 against the fixture 26. Many variations are therefore possible without departing from the concept of draping the component over the first element of the plunger and eventually moving an end of the casing into engagement with the component to finally locate the component in an annular groove.

Figure 6:
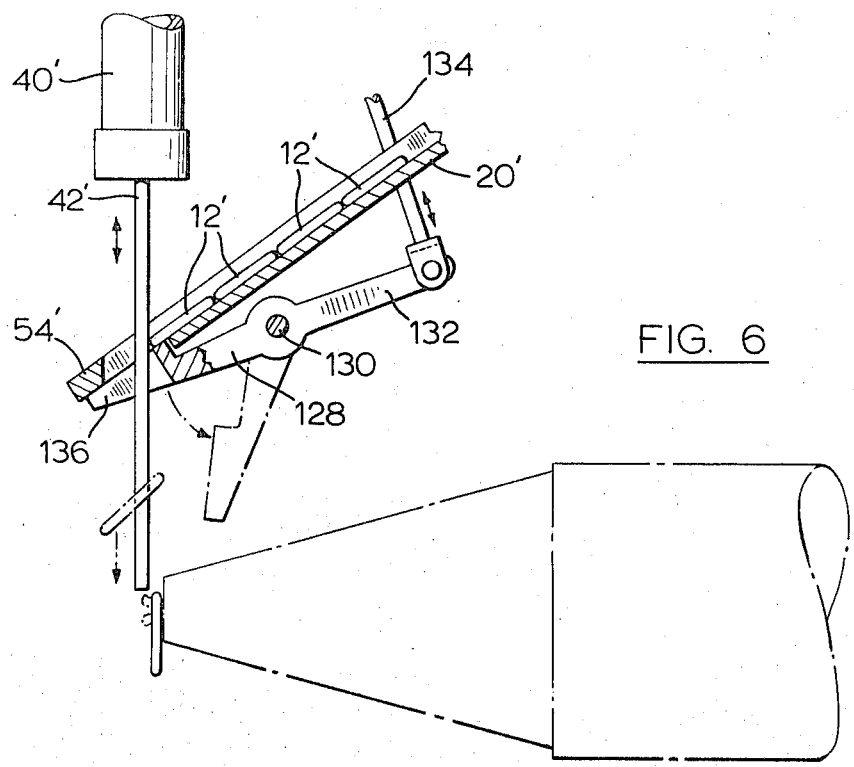
FIG. 6 is a view similar to FIG. 2 and showing another embodiment incorporating the invention.

Reference is now made to FIG. 6 to describe an alternative embodiment of the escapement previously described. In this figure parts similar to those which have already been described are given primed numerals for comparison with previous figures. Components 12' slide down a chute 20' ending in a position indicated in ghost outline against a stop 54' attached to the chute 20'. A movable element in the form of a forked lever 128 is pivotally mounted on a pivot pin 130 and attached to a further lever 132 at the side of the chute 20'. The distal end of this lever is coupled to a fourth actuator 134 (part of which is shown) for rotating the levers on the pins 130 so that the lever 128 is movable between a guide position shown in full outline and a withdrawn position shown in ghost outline. In the guide position, a component 12' in engagement with stop 54' rests on a forked end of the lever 128. Upon energising actuator 40' so that rod 42' moves downwardly, the rod is accommodated in slot 136 at the forked end of lever 128. Upon withdrawing the lever 128 into the position shown in ghost outline, a component 12' falls downwardly between the stop 54' and the main part of the chute 20'.

FIG. 6 also illustrates another type of plunger in ghost outline. This plunger is of a type shown in U.S. Pat. No. 3,605,239 for applying seals externally to a workpiece. It will be evident that fingers on the end of the plunger can be positioned to receive the component as it falls off the rod 42' in a similar fashion to the location of component 14 (FIG. 1) previously described.

Figure 7:
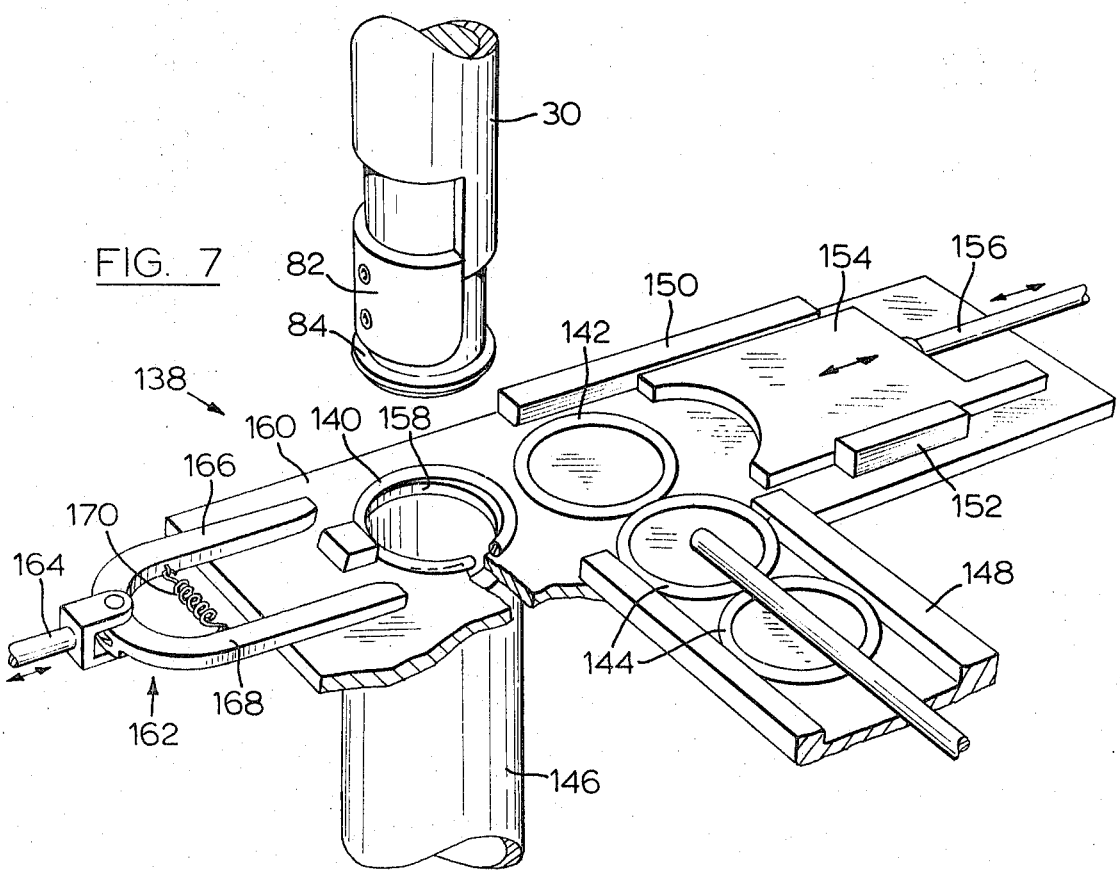
FIG. 7 is a perspective view of part of yet another embodiment incorporating the invention.

In some applications it will be preferable to arrange for the plunger 30 (FIG. 1) to move vertically either upwards or downwards. In such an application, the component will not hang on the plunger as shown in FIG. 1 but must be deformed into contact with the plunger. A suitable structure is shown in FIG. 7 for use with a plunger which moves vertically downwards. It will be evident that a similar structure could be used for a plunger moving vertically upwards.

As seen in FIG. 7 the plunger 30 can be used with another escapement 138 to move components 140, 142, 144 vertically downwards into workpieces such as a workpiece 146. In this embodiment the arrangement is such that the components do not move under gravity. By contrast with the FIG. 1 embodiment the components 144 are moved along a guide 148 by any suitable means such as a vibrator, an air blast or the like until one component is in the position of component 142 on a platform 149 and against a shoe 150. This shoe together with shoe 152 combine to guide a slider 154 which can be reciprocated by an actuator 156 (part of which is shown). Movement of this actuator pushes component 142 into position over an opening 158 in a base plate 160 whereupon the slider 154 is withdrawn and the plunger 30 is mover into a position in which the enlarged end portion 84 has just entered the opening 158. Next a spring-loaded tool 162 is moved by an actuator 164 (part of which is shown) into engagement with the component 140. The tool 162 has legs 166, 168 biassed towards one another by a spring 170 so that the component 140 will be squeezed into the space between plunger end portion 84 and saddle piece 82. The plunger is then moved downwardly drawing the component 140 into the workpiece in the manner described with reference to FIGS. 2 to 5. Thus it will be evident that although the escapement 138 differs from that shown in FIG. 1, the plunger 30 can be used to insert components vertically as well as horizontally.

What I claim is:

1. Apparatus for placing a distensible annular component in a seat formed in a workpiece, the apparatus comprising:

feed means adapted to align the component with other similar components;

an escapement positioned to receive the component from the feed means;

a transport mechanism including a plunger having an end portion below the escapement for receiving the component from the escapement with the plunger in a rest position, and an actuator coupled to the plunger to move the plunger axially to carry the component towards the seat in the workpiece, the plunger continuing to move until it reaches an extended position where the component is located adjacent the seat, whereupon further movement of the actuator causes the plunger to take up a strip position thereby causing the component to move into the seat;

the escapement comprising: a movable element adapted to receive the component off the feed means and to support the component above said plunger end portion; a further actuator coupled to the movable element to move said element between a guide position in which the element supports the component and a withdrawn position which permits the component to fall; a rod arranged for movement between a withdrawn position in which a lower end of the rod is above the movable element, and an extended position in which the rod projects through the component as the component rests on the movable element and in which said end of the rod is immediately adjacent the plunger end portion with the plunger in the withdrawn position; another actuator coupled to the rod to move the rod between said withdrawn and extended positions; and a sequential control system coupled to the respective actuators to move the actuators sequentially, whereby with the plunger in the withdrawn position, the movable element in the guide position, and the rod in the extended position, the component may be moved onto the plunger end portion by causing said further actuator to move the movable element into the withdrawn position whereupon the component falls onto the plunger end portion guided by the rod.

2. Apparatus as claimed in claim 1 and further comprising a fixture aligned with the plunger for locating the workpiece relative to the transport mechanism, the fixture including means sensitive to the engagement of the workpiece in the fixture and coupled to the sequential control system for commencing a cycle whereby the component is placed in said seat.

3. Apparatus as claimed in claim 1 in which the movable element is moved linearly between said guide and withdrawn positions.

4. Apparatus as claimed in claim 1 in which the movable element is moved angularly between said guide and withdrawn positions.

5. Apparatus as claimed in claim 1 in which the plunger comprises: a casing; an inner element slidably engaged in the casing for movement axially relative to the casing, said inner element defining said plunger end portion; means biassing the inner element axially outwards of the casing; means limiting outward movement of the inner element to retain the inner element in a predetermined axial position relative to the casing; a saddle piece attached to the inner element adjacent said end portion and positioned on an upwardly-facing portion of the inner element, the saddle piece being adapted to push the component into the workpiece as the plunger moves from the rest position to the extended position with a lower portion of the component trailing behind the remainder of the component and below the saddle piece; said casing having a forward portion adapted to be moved along the inner element below the saddle piece when the plunger is moved between the extended position and the strip position to thereby move the lower portion of the component into alignment with the seat to engage the component in the seat.

6. Apparatus as claimed in claim 5 and further comprising a fixture aligned with the plunger for locating the workpiece relative to the transport mechanism, the fixture including means sensitive to the engagement of the workpiece in the fixture and coupled to the sequential control system for commencing a cycle whereby the component is placed in said seat, said inner element being in engagement with said fixture with the plunger in the extended position to thereby prevent further movement of the inner element so that further movement of the plunger results only in the casing moving axially to cause the forward portion to make said movement along the inner element below the saddle piece.

7. Apparatus for placing a distensible annular component in a seat formed in a workpiece, the apparatus comprising:

feed means adapted to align the component with other similar components;

an escapement positioned to receive the component from the feed means;

a transport mechanism including a plunger having an end portion adapted to receive the component from the escapement with the plunger in a rest position, and an actuator coupled to the plunger to move the plunger axially; the plunger comprising: a casing; an inner element slidably engaged in the casing for movement axially relative to the casing, said inner element defining said plunger end portion; means biassing the inner element axially outwards of the casing; means limiting outward movement of the inner element to retain the inner element in a predetermined axial position relative to the casing; a saddle piece attached to the inner element adjacent said end portion and positioned at a side of the inner element, the saddle piece being adapted to push the component into the workpiece as the plunger is driven by the actuator from the rest position to an extended position with a portion of the component not in contact with the saddle piece trailing behind the saddle piece, the component then being adjacent said seat; and means limiting further axial movement of the inner element beyond the extended position and said casing having a forward portion adapted to be moved axially along the inner element to one side of the saddle piece when the plunger is moved by the actuator from the extended position to a strip position whereby the forward portion pushes said trailing portion of the component into alignment with the seat to engage the component in the seat.

8. Apparatus as claimed in claim 5 in which the plunger end portion is enlarged and the component is located between this enlarged end portion and the saddle piece.

9. Apparatus as claimed in claim 7 in which the plunger end portion is enlarged and the component is located between this enlarged end portion and the saddle piece.

10. Apparatus as claimed in claim 7 in which the plunger moves vertically, and in which the escapement comprises: a platform for receiving the components from the feed means; said platform defining an opening, adapted to slidably receive at least said end portion of the plunger; a slider mounted on the platform and movable to push a leading one of the components along the platform into position about said platform opening; means adapted to move said leading one of the components into engagement with said plunger end portion adjacent the saddle piece to retain the component in this position while the plunger pushes the component through the opening in the platform to thereby move the component into position with said portion of the component not in contact with the saddle piece trailing behind the saddle piece.

* * * * *